US011927345B1

(12) United States Patent
Platvoet et al.

(10) Patent No.: US 11,927,345 B1
(45) Date of Patent: Mar. 12, 2024

(54) METHOD AND DEVICE TO REDUCE EMISSIONS OF NITROGEN OXIDES AND INCREASE HEAT TRANSFER IN FIRED PROCESS HEATERS

(71) Applicant: XRG Technologies, LLC, Tulsa, OK (US)

(72) Inventors: Erwin Platvoet, Owasso, OK (US); Matthew Martin, Tulsa, OK (US)

(73) Assignee: XRG Technologies, LLC

( * ) Notice: Subject to any disclaimer, the term of this patent is extended or adjusted under 35 U.S.C. 154(b) by 370 days.

(21) Appl. No.: 16/806,578

(22) Filed: Mar. 2, 2020

Related U.S. Application Data

(60) Provisional application No. 62/812,478, filed on Mar. 1, 2019.

(51) Int. Cl.
| | |
|---|---|
| *F23C 6/04* | (2006.01) |
| *F23D 14/22* | (2006.01) |
| *B01D 53/56* | (2006.01) |
| *F23C 9/00* | (2006.01) |
| *F23C 9/08* | (2006.01) |

(Continued)

(52) U.S. Cl.
CPC ............. *F23C 6/047* (2013.01); *F23D 14/22* (2013.01); *B01D 53/56* (2013.01); *F23C 9/006* (2013.01); *F23C 9/08* (2013.01); *F23C 2201/20* (2013.01); *F23C 2201/30* (2013.01); *F23C 2202/30* (2013.01); *F23L 7/007* (2013.01); *F23M 5/025* (2013.01)

(58) Field of Classification Search
None
See application file for complete search history.

(56) References Cited

U.S. PATENT DOCUMENTS

| | | | | |
|---|---|---|---|---|
| 2,270,637 | A | * 1/1942 | Komar | .................... F23D 11/10 |
| | | | | 239/417.5 |
| 3,807,321 | A | * 4/1974 | Stockman | ............... F23G 5/027 |
| | | | | 110/236 |

(Continued)

FOREIGN PATENT DOCUMENTS

| | | |
|---|---|---|
| GB | 786962 A * | 11/1957 |
| GB | 1259351 A | 1/1972 |

(Continued)

OTHER PUBLICATIONS

He, Yu , "Flameless Combustion of Natural Gas in the SJ/WJ Furnace", Apr. 2008, pp. 1-213 Publisher: Queens University, Kingston, Ontario, Canada.

(Continued)

*Primary Examiner* — Jason Lau
(74) *Attorney, Agent, or Firm* — Crowe & Dunlevy, P.C.

(57) ABSTRACT

A method and device for reducing emissions of nitrogen oxides and for increasing heat transfer in a fired process heater is disclosed herein. The invention relates generally to the combustion of fuel using some proportion of air as the oxidant which leads to the production of oxides of nitrogen, and more particularly to a method and device that reduces the production of nitrogen oxides from combustion, promotes the appropriate distribution of temperature to reduce fouling of the process tubes in a fired heater, and increases the efficiency of heat transfer to the same process tubes.

24 Claims, 11 Drawing Sheets

(51) Int. Cl.
*F23L 7/00* (2006.01)
*F23M 5/02* (2006.01)

(56) References Cited

U.S. PATENT DOCUMENTS

| | | | | |
|---|---|---|---|---|
| 4,296,921 | A | * | 10/1981 | Hayashi ................ C21C 7/0037 |
| | | | | 138/140 |
| 4,475,472 | A | * | 10/1984 | Adrian ...................... F23K 1/00 |
| | | | | 110/211 |
| 4,995,807 | A | * | 2/1991 | Rampley ................... F23C 9/00 |
| | | | | 431/115 |
| 5,135,387 | A | | 8/1992 | Martin et al. |
| 5,165,884 | A | | 11/1992 | Martin et al. |
| 5,316,469 | A | | 5/1994 | Martin et al. |
| 6,015,540 | A | | 1/2000 | McAdams et al. |
| 6,383,461 | B1 | | 5/2002 | Lang |
| 6,383,462 | B1 | * | 5/2002 | Lang ........................ F23C 9/08 |
| | | | | 423/210 |
| 6,609,907 | B1 | * | 8/2003 | Wood ....................... F23C 9/08 |
| | | | | 432/152 |
| 6,796,789 | B1 | | 9/2004 | Gibson et al. |
| 7,153,129 | B2 | | 12/2006 | Bussman et al. |
| 7,172,412 | B2 | | 2/2007 | Platvoet et al. |
| 2003/0175640 | A1 | * | 9/2003 | Stephens ............. F23M 11/042 |
| | | | | 431/9 |
| 2003/0234009 | A1 | * | 12/2003 | Kennedy ............. F28D 1/05316 |
| | | | | 123/568.12 |
| 2005/0061378 | A1 | * | 3/2005 | Foret ......................... F04F 5/04 |
| | | | | 137/888 |
| 2014/0080072 | A1 | * | 3/2014 | Smirnov ............... F23D 14/725 |
| | | | | 431/6 |
| 2017/0336123 | A1 | | 11/2017 | Dodson |

FOREIGN PATENT DOCUMENTS

| | | | |
|---|---|---|---|
| JP | 2000065316 A | * | 3/2000 |
| JP | 2005231984 A | * | 9/2005 |
| WO | 0169132 A1 | | 9/2001 |
| WO | 2010036372 A1 | | 4/2010 |

OTHER PUBLICATIONS

Wunning, J, "Flameless Oxidation", Oct. 17-19, 2005, Publisher: 6th HITACG Symposium—2005, pp. 1-13, Essen, Germany.
International Search Report and Written Opinion PCT/US2023/061912 dated Jul. 14, 2023.

* cited by examiner

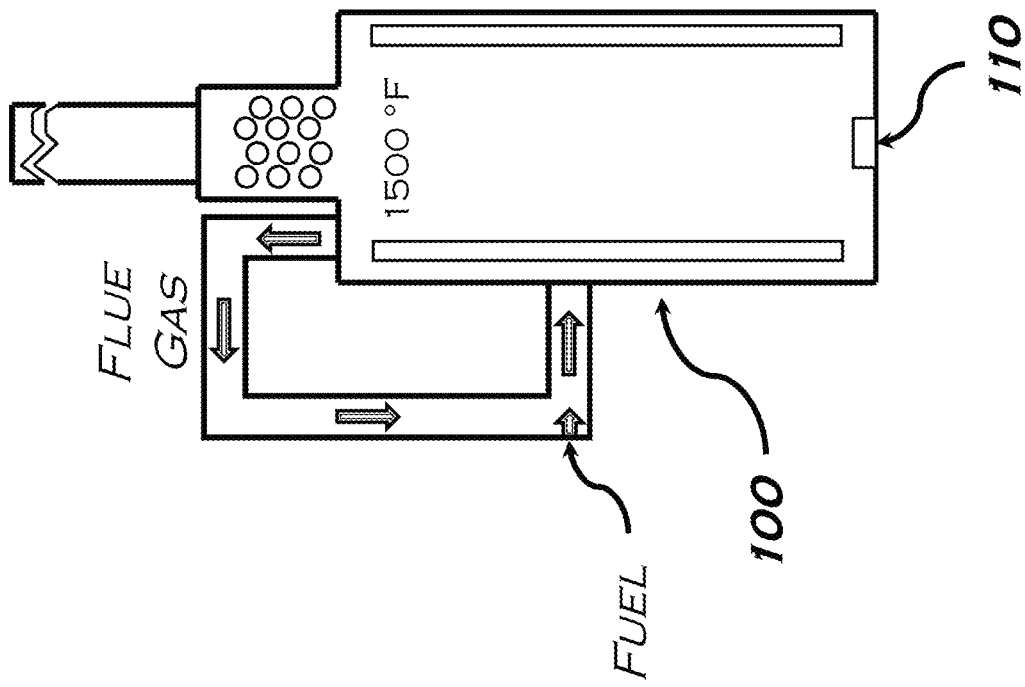
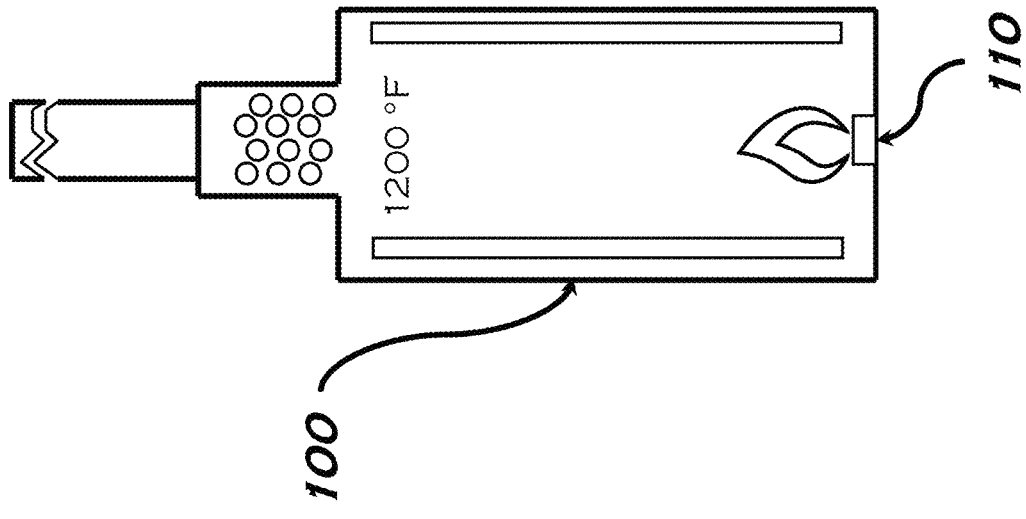

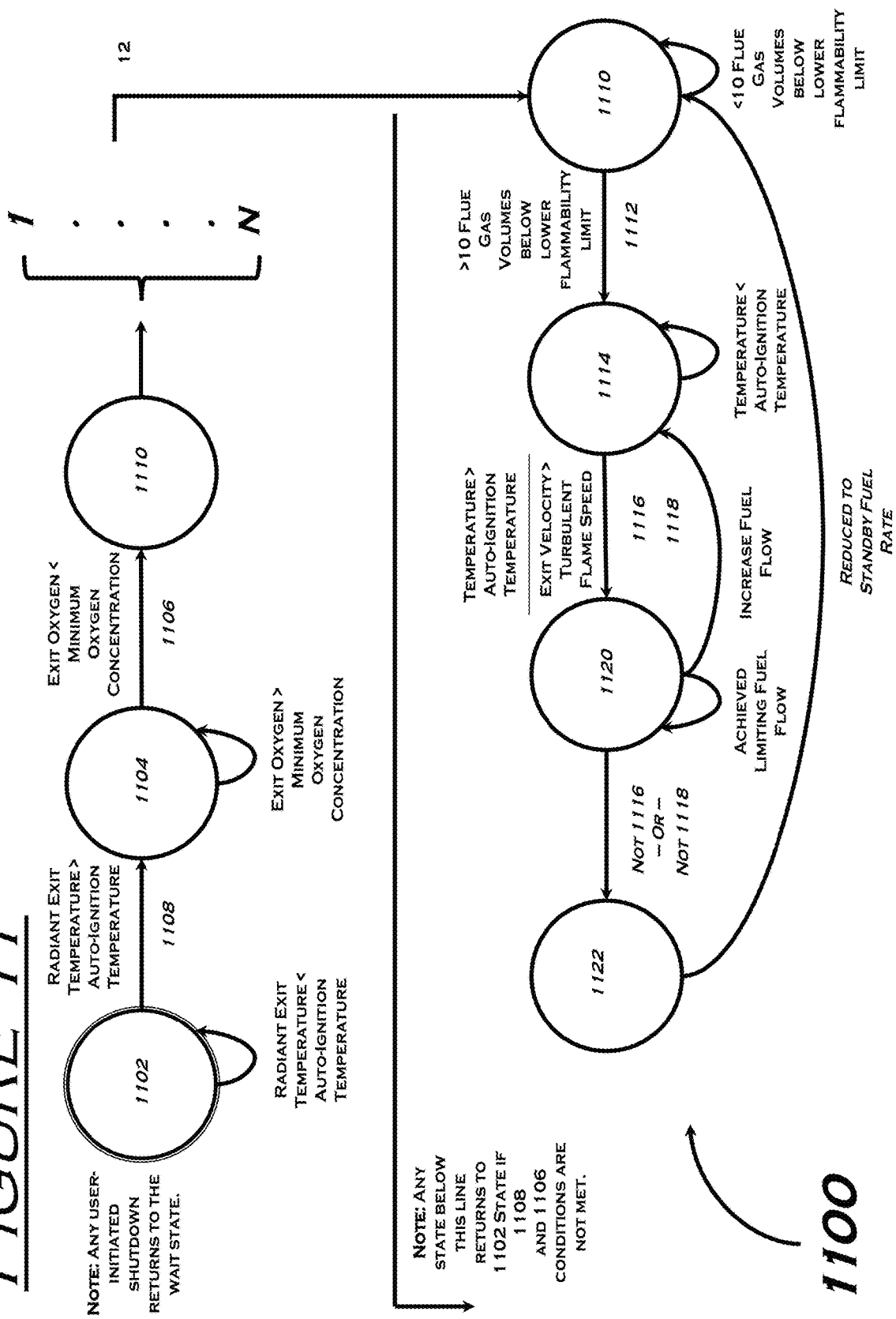

METHOD AND DEVICE TO REDUCE EMISSIONS OF NITROGEN OXIDES AND INCREASE HEAT TRANSFER IN FIRED PROCESS HEATERS

CROSS-REFERENCE TO RELATED APPLICATIONS

This application claims the benefit of U.S. Provisional Patent Application No. 62/812,478 filed on Mar. 1, 2019 and incorporates said provisional Applications by reference into this document as if fully set out at this point.

BACKGROUND OF THE INVENTION

1. Field of the Invention

This invention relates generally to the combustion of fuel using some proportion of air as the oxidant which leads to the production of oxides of nitrogen, and more particularly to a method and device that reduces the production of nitrogen oxides from combustion, promotes the appropriate distribution of temperature to reduce fouling of the process tubes in a fired heater, and increases the efficiency of heat transfer to the same process tubes.

2. Description of the Related Art

Nitrogen dioxide ($NO_2$) in the atmosphere, a component of nitrogen oxides, more commonly known as $NO_x$, emissions, has documented negative respiratory health effects, particularly for asthmatics, the elderly and children. NO reacts with other airborne chemicals to produce ozone and particulate matter. Additionally, atmospheric NO has negative environmental effects including acid rain, haze, and pollution of coastal waters.

Carbon dioxide ($CO_2$) has been recognized as a contributor to global warming. $NO_2$ is recognized as a greenhouse gas with 298 times the global warming potential of $CO_2$. Any solution which reduces $NO_x$ at a great expense to the system efficiency will in turn produce more $CO_2$ emissions due to increased fuel usage; the use of fans, low temperature combustion, and injection of extra diluents all reduce the net heater efficiency.

In the United States alone there are 135 operating refineries with an estimated existing 1,393 fired heaters. Any economically feasible technical solution should be retrofittable onto the existing equipment at a cost that is less than that of entire equipment replacement. A technical solution for emission reduction that also increases the efficiency of fired equipment will more rapidly increase industrial adoption due to the economic, rather than solely legislative, incentive resulting from its use.

Fired heaters count among the most important pieces of equipment in any refinery or petrochemical plant. Refiners and petrochemical producers use this heat transfer equipment for preheating petroleum or petroleum derived feedstocks for further processing to produce products such as olefins, fuel gas, gasoline, diesel fuel, heavy fuel oil and coke. The feedstocks are of variable composition and boiling range and require preheating to varying temperatures for further processing.

Direct fired heaters are usually provided with two sections, a radiant section and a convection section (FIG. 2). The radiant section consists of a refractory lined enclosure with one or more tubular heating coils through which the process fluid flows. The heating coils surround one or more burners typically fueled by gas. The heating coils are arranged to form a combustion chamber into which high temperature combustion products generated by the burners are discharged. Radiation is the principal mechanism of heat transfer from the combustion products to the heating coils and the process fluid they contain. Process fluid is usually preheated in a convection section prior to entering the radiant section. The convection section consists of a refractory lined enclosure containing multiple rows of tubes. The rows and the tubes comprising the rows are closely spaced, forming channels through which combustion products (flue gas), leaving the radiant section, pass at relatively high velocity. Here, convection is the principle mode of heat transfer from the combustion products to the heating coils and the process fluid they contain. Ideally, the spent combustion products leave the convection section at low temperature corresponding to a high overall heater thermal efficiency.

$NO_x$ production in flames is classified as 'prompt $NO_x$', 'fuel $NO_x$', and 'thermal $NO_x$'. Prompt $NO_x$ occurs in fuel rich zones where there is molecular nitrogen. The contribution of prompt $NO_x$ to the total $NO_x$ produced in industrial combustion is relatively small. Most industrial combustion devices designed to prevent the generation of $NO_x$ have focused on optimizing the mixing of the fuel, air, and flue gas to reduce the temperature at which combustion occurs. A smaller percentage of devices have attempted to reduce fuel rich zones to prevent prompt $NO_x$. However, most practical devices that reduce the temperature of combustion increase the volume over which fuel rich combustion occurs due the gas being staged away from the air stream. Fuel $NO_x$ is not a significant concern for most gas-fired heaters.

Burners introduce and mix fuel and air into the radiant section, also called a firebox. Burners can be classified in many different categories, depending on how the fuel and air are mixed. Diffusion burners introduce air and fuel separately and direct these fluids to mix in the flame zone. Premix burners mix a portion of the fuel with some or all the combustion air before these fluids enter the flame zone. In a staged air burner, all fuel is injected in one location while air is gradually introduced in several stages, whereas in a staged fuel burner, all air enters through the burner while the fuel is injected in various zones or stages into the flame. A forced draft burner relies on a fan to 'push' the air into the combustion zone, and a natural draft burner relies on the density difference between ambient air and the firebox to draw in the combustion air. Natural draft burners are the most common type in the United States of America.

The most frequent issue with flames in fired heaters is the production of $NO_x$. Over 90% of the NOx from a typical flame is in the form of NO and the remainder is $NO_2$. However, since NO eventually converts to $NO_2$ in the atmosphere, most regulations treat all $NO_x$ as $NO_2$.

During the last 40 years, burner vendors have changed their designs to reduce $NO_x$ emissions by injecting fuel into two or more 'stages' to lengthen the flame (fuel staging), by diluting a portion of the fuel with combustion air (partial premix), or using the momentum of the fuel to entrain inert firebox gases into the flame and dilute the combustion zone (flue gas recirculation). These techniques all aim to delay combustion reactions by diluting the reactants as much as possible with combustion products while maintaining a flame, thus lowering the flame temperature to the maximum extent possible. The latest generation of these burners is commonly called 'Ultra-Low $NO_x$' or ULN type.

$NO_x$ emissions from the latest generation of burner designs are about 10% of the emissions from conventional diffusion mix gas burners. Typical and achievable $NO_x$ emissions from an ULN burner firing natural gas in a refinery application are about 15 ppm at 3 vol % 02. This increases to about 20 ppm for typical refinery fuel gas, consisting of 50% $CH_4$, 25% $H_2$ and 25% $C_2+$.

While this is a substantial improvement, the most recent requirements for emissions from process heaters in non-attainment areas call for $NO_x$ levels below 10 PPM. This is beyond the capabilities of ULN burners and requires the installation of 'Selective Catalytic Reduction' (SCR) reactors to convert the nitrogen oxides to nitrogen with the use of ammonia or urea. While these SCR reactors can achieve conversion levels of 95% and higher, there are now new emissions of ammonia to monitor and control. The SCR, ammonia skid, and all the associated piping, ducting and instrumentation may typically require investments of over $1 MM and require plot space, making combustion-based methods of reducing NO preferable when applicable.

Unfortunately, because of the extreme dilution, ultra-low NOx flames tend to be voluminous, long and 'lazy' compared to more conventional style burners. It also means that the flames become sensitive to the prevailing flue gas circulation patterns. Many installations of ultra-low NOx burners have suffered from flame rollover and impingement on coils.

Flame impingement on radiant coils results in hot spots, leading to excessive oxidation, creep and carburization, internal fouling due to coking of the process fluid, reduction in heater capacity, short run length between cleaning, poor heat distribution and reduced thermal efficiency, high excess air, high emissions of $NO_x$, and reduced coil life, risk of tube rupture and subsequent safety concerns.

The high rate of inert flue gas that is recirculated in ULN flames can cause flame stability issues, especially at turndown conditions when the firebox is cold. The flames can become irregular, pulsating, lifting off or even completely extinguished. High levels of carbon monoxide and unburned hydrocarbons can be present in the stack gas, creating risk of afterburning in the convection section, or even an explosion. ULN burners are typically designed with many small fuel ports to maximize the flue gas entrainment. Minimum port sizes are limited by American Petroleum Institute recommended practices, but the ignition ports that are important for flame stability can still be as small as 1/16 of an inch. This makes ULN burner fuel injection ports highly sensitive to fouling. Refinery fuel gas typically contains some fraction of heavy hydrocarbons, aerosols, polymers of aromatics and other contaminants that cause plugging of the hot burner gas tips with contain the ports. Burner fouling is a common reason for flame stability issues and causes maintenance and safety issues for many refineries.

Because of the high temperature to which hydrocarbon process fluids in the radiant section are subjected, fluid at the inside wall of the tubular heating coil (also referred to as "tube" or "coil") at this location experience a degree of thermal decomposition, leaving behind adherent coke deposits which reach maximum thickness at the outlet of the heater coil. These deposits restrict the transfer of heat from the tube wall to the contained process fluid so that the tube wall eventually reaches its design temperature. At this point, referred to as an end of run condition, operators must shut down and de-coke the tubes to avoid damage and to remove the coke deposits. The time interval between shutdowns for decoking is referred to as run-length. Fouling in heaters has become significantly more problematic in recent years. The main reason is the shift towards lower cost crudes and Canadian oil sands bitumen as refinery feeds. They contain more metals, asphaltenes and other impurities that cause increased coking rates. To prevent or limit coking, the inside process film temperature needs to be kept as low and as uniform throughout the tube as possible.

The burners that supply the heat for the process are typically placed in the floor of the radiant firebox. The heat supplied to the tubes is not uniform. The variation in heat flux is commonly known as the heat flux profile. The heat flux profile that is generated by the burners is a function of fuel type and composition, excess air, burner liberation rate, burner pressure-drop, and detailed burner design parameters such as fuel port drillings and staging.

Fouling in process heaters is exacerbated by two heat maldistributions: 1) around the circumference of the tubes, and 2) along the direction of the flame. In fired heaters, radiant section tubes are commonly placed against a refractory wall with the burners on the other side. This causes a substantial difference between the radiant heat received by the side of the tube facing the flame compared to the backside of the tube that is not. As illustrated in FIG. 1, for an average flux of 10,000 (e.g. Watts per square meter), the face of the tube receives 18,000 $W/m^2$ compared to only 6,000 $W/m^2$ for the backside of the tube. The circumferential flux ratio in this case is 18,000/10,000=1.8. In such a system, the front face of the tube receives a higher flux and has a higher temperature than the backside. As a result, the film temperature on the front face will be higher and it will be the surface that will foul first.

Dilution of fuel gas in a high temperature environment in the presence of oxygen to a point at which flame can no longer form, but for which combustion reactions may proceed, has proven to lower $NO_x$. This form of flameless combustion also reduces temperature gradients within the flue gas, alleviating many of the heat uniformity issues previous described.

Certain combustion systems, such as thermal oxidizers, can utilize highly diffuse, or flameless, combustion. Practical issues arise when one considers that the combustion volume of a fired heater is different than that of a thermal oxidizer or most systems that use regenerative burners in that the later combustion volumes are essentially adiabatic. Within the fired heater the temperature of the combustion volume is more variable and when measured at the surface of the tubes will often be below the autoignition temperature of the fuel gas. Fired heaters also often have turndown requirements at which the outlet temperature is near or below the autoignition temperature of many the common fuel gas components in typical refinery fuel gas.

External flue gas recirculation is a known method for reduction of $NO_x$. In this scheme, flue gas is drawn from a location after the heat transfer surfaces and intermixed with the air stream supplied to the burners. The mass flow rate of combustion products through the convection section of the heater is thus increased; if the flue gas pressure increase is greater than the pressure available from the heater design, either from the stack or from fans, then the flue gas recirculation rate is limited, thus limiting the potential for $NO_x$ reduction. If the mass flow of recirculated flue gas is too great, the burners lose flame due to lack of oxygen supplied to the fuel gas. If unburned fuel passes through the heater it is recycled into the air stream with the flue gas feeding the burner, causing a potential safety hazard whereby flame propagates into the flue gas recirculation ductwork, which was not designed to handle flame, and also choking off the air supply to the burners. The current invention alleviates these problems by recycling the flue gas before the convection section so the total mass flow rate through the convection section is unchanged, removing the need for increased fan pressure or natural draft. The current invention does not mix the staged fuel gas with the burner air, so diluting the burner oxidant to the point of flameout is impossible. Additionally, because flue gas potentially contaminated with unburned fuel gas from the burner is not mixed with the burner oxidant, backburning resulting in lack of oxidant to the burner is not possible.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a device for reducing emissions of nitrogen oxides and for increasing heat transfer in a fired process heater. The fired process heater has a radiant section with a plurality of process tubes and a burner. The device includes a flue gas entrainment unit and ductwork for attaching the entrainment unit to the fired process heater. The device includes a fluid outlet, a fluid inlet and a fluid flow path intermediate of the fluid inlet and the fluid outlet. The entrainment unit fluid outlet is configured to attach to the fired process heater such that the entrainment unit fluid flow path is in fluid communication with the radiant section of the fired process heater. The entrainment unit also includes an inlet section of reducing diameter, a mixing section of constant diameter, and an exit section of expanding diameter. In addition, the entrainment unit includes a fuel injector configured to issue fuel at subsonic, sonic, or supersonic velocity into the entertainment unit fluid flow path.

The ductwork includes a fluid outlet, a fluid inlet and a fluid flow path intermediate of the fluid inlet and the fluid outlet. The ductwork fluid outlet is attached to the entrainment unit fluid inlet such that the ductwork fluid flow path is in fluid communication with the entrainment unit fluid flow path. The ductwork fluid inlet is configured to attach to the fired process heater such that the ductwork fluid flow path is in fluid communication with the radiant section of the fired process heater.

The flue gas entrainment unit further can also include a fluid injector configured to issue a reagent fluid, such as ammonia, urea or a mixture thereof, at subsonic, sonic, or supersonic velocity into the entertainment unit fluid flow path.

The device can also include a venturi eductor configured to attached to the entertainment unit fluid outlet and further configured to attach to the fired process heater. The venturi eductor has a fluid outlet, a fluid inlet and a fluid flow path intermediate of the fluid inlet and the fluid outlet. The venturi eductor fluid inlet is attached to the entrainment unit fluid outlet such that the venturi eductor fluid flow path is in fluid communication with the entrainment unit flow path. The venturi eductor can be configured to use a secondary fluid, such as steam, to increase the fluid flow through the flue gas entrainment unit. Like the entrainment unit, the venturi eductor has an inlet section of reducing diameter, a mixing section of constant diameter, and an exit section of expanding diameter. The venturi eductor can also have a fluid injector configured to issue a reagent fluid, such as ammonia, urea or a mixture thereof, at subsonic, sonic, or supersonic velocity into the fluid flow path of the venturi eductor.

In general, in a second aspect, the invention relates to a device for reducing emissions of nitrogen oxides and for increasing heat transfer in a fired process heater. The fired process heater has a radiant section with a plurality of process tubes and a burner. The device has a flue gas entrainment unit, a venturi eductor and associated ductwork for attaching the device to the fired process heater.

The flue gas entrainment unit has a fluid outlet, a fluid inlet and a fluid flow path intermediate of the fluid inlet and the fluid outlet. The entrainment unit also has an inlet section of reducing diameter, a mixing section of constant diameter, and an exit section of expanding diameter. In addition, the entertainment unit has a fuel injector configured to issue fuel at subsonic, sonic, or supersonic velocity into the entertainment unit fluid flow path.

The device also includes ductwork having a fluid outlet, a fluid inlet and a fluid flow path intermediate of the fluid inlet and the fluid outlet. The ductwork fluid outlet is attached to the entrainment unit fluid inlet such that the ductwork fluid flow path is in fluid communication with the entrainment unit flow path. The ductwork fluid inlet is configured to attach to the fired process heater such that the ductwork fluid flow path is in fluid communication with the radiant section of the fired process heater.

The device further includes a venturi eductor having a fluid outlet, a fluid inlet and a fluid flow path intermediate of the fluid inlet and the fluid outlet. The venturi eductor fluid inlet is attached to the entrainment unit fluid outlet such that the venturi eductor fluid flow path is in fluid communication with the entrainment unit fluid flow path. The venturi eductor fluid outlet is attached to the fired process heater such that the venturi eductor fluid flow path is in fluid communication with the radiant section of the fired process heater. The venturi eductor further includes an inlet section of reducing diameter, a mixing section of constant diameter, and an exit section of expanding diameter. The venturi eductor is configured to use a secondary fluid to increase the fluid flow through the flue gas entrainment unit.

The ductwork may include an internal lining of refractory material encased in steel, an internal high-temperature steel lining with external installation, or both. The entrainment unit, the venturi eductor or both can include an interior core of heat resistant material and an exterior casing of steel, an interior of heat resistant steel encased with external insulation, or both. The heat resistant material can be a refractory ceramic oxide. The entrainment unit may have a thermocouple downstream of the fuel injector, a zirconia oxygen sensor downstream of the fuel injector, a tunable diode laser downstream of the fuel injector, or a combination thereof. Additionally, the entrainment unit, the ductwork or both further comprise a hot-wire anemometer. The entrainment unit, the venturi eductor or both can also have a fluid injector configured to issue a reagent fluid, such as ammonia, urea or a mixture thereof, at subsonic, sonic, or supersonic velocity into the entrainment unit fluid flow path or the venturi eductor fluid flow path, respectively.

In general, in a third aspect, the invention relates to a fired process heater having the device of the first aspect above of the invention.

In general, in a fourth aspect, the invention relates to a fired process heater having the device of the second aspect above of the invention.

In general, in a fifth aspect, the invention relates to a method for reducing emissions of nitrogen oxides and for increasing heat transfer in a fired process heater using the device of the first aspect above of the invention. The method can include operating the fired process heater in a continuous pilot in operation between a conventional heat mode and a flameless heat mode.

In general, in a sixth aspect, the invention relates to a method for reducing emissions of nitrogen oxides and for increasing heat transfer in a fired process heater using the device of the second aspect above of the invention. The method can include operating the fired process heater in a continuous pilot in operation between a conventional heat mode and a flameless heat mode.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 3A is a cross-sectional view of an example of a fired process heater in conventional fire mode for reducing emissions of nitrogen oxides and for increasing heat transfer in a fired process heater in accordance with an illustrative embodiment of the invention disclosed herein.

FIG. 3B is a cross-sectional view of an example of a fired process heater in a flameless mode for reducing emissions of nitrogen oxides and for increasing heat transfer in a fired process heater in accordance with an illustrative embodiment of the invention disclosed herein.

FIG. 11 is a state diagram of an example of a process for reducing emissions of nitrogen oxides and for increasing heat transfer in a fired process heater in accordance with an illustrative embodiment of the invention disclosed herein.

DETAILED DESCRIPTION OF THE INVENTION

Figure 1:
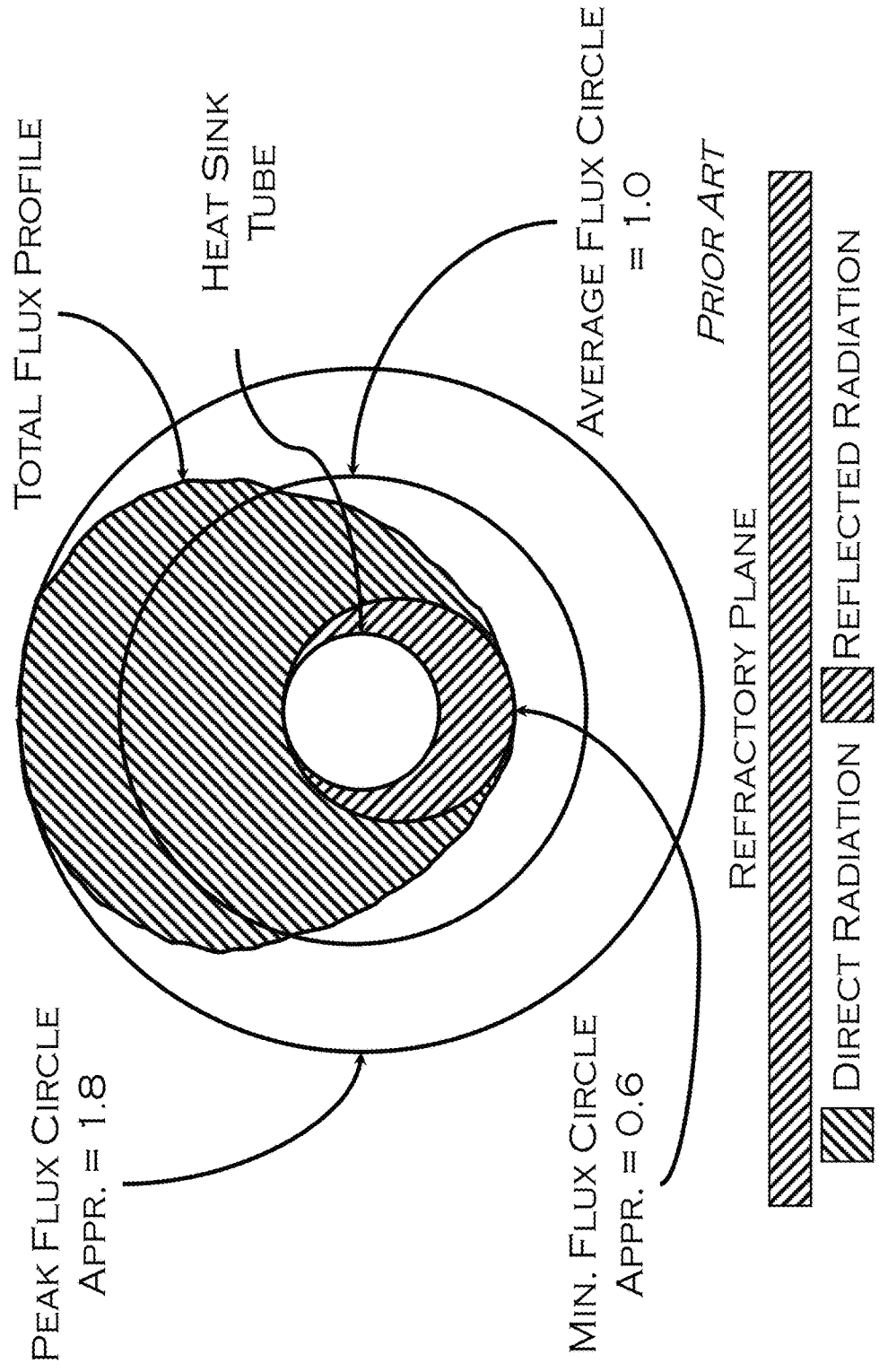
FIG. 1 is a cross-sectional view illustrating circumferential flux variation for a tube backed by a wall in a prior art heater for delayed coker or vacuum distillation service.
Figure 2:
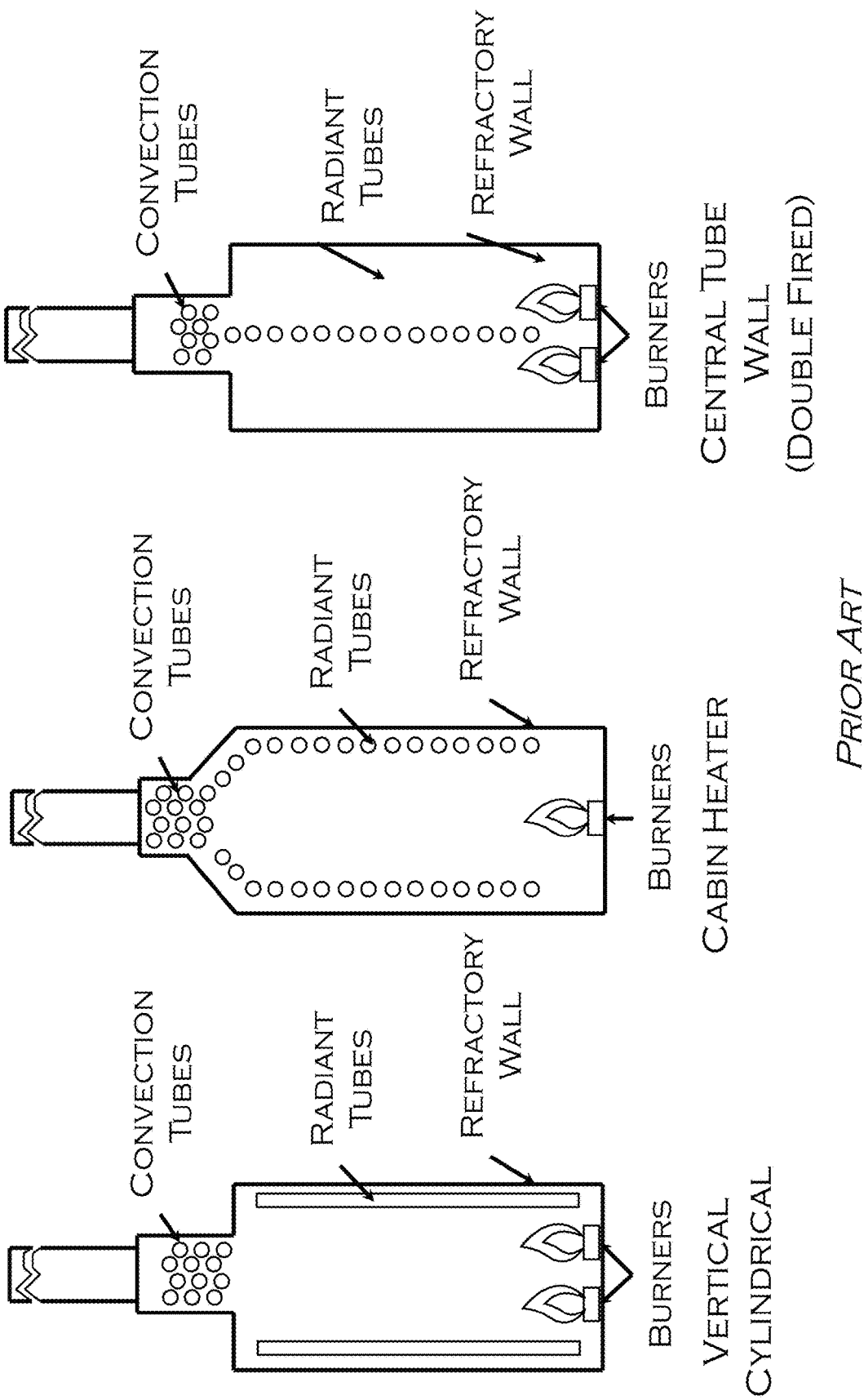
FIG. 2 is a cross-sectional views of conventional direct fired process heaters having two sections, a radiant section and a convection section.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

A method and device for reducing emissions of nitrogen oxides and for increasing heat transfer in a fired process heater is disclosed herein. The original burners 110 of the fired process heater 100 remain in place, with a continuous pilot in operation. In accordance with the invention, the burners 110 serve two functions: during heater 100 startup they are used in a conventional mode (i.e. with a flame) to bring the firebox 102 up to temperature (>1280° F.) (See FIG. 3A); and during a flameless mode, the burner fuel supply is turned off and the burners 110 are only used to introduce the air for oxidation (See FIG. 3B). One major advantage of keeping the original burners 110 in place, with the air supply and pilots running, with the operating switching back to the conventional mode in case of high turndown or in case of a safety concern. This is a major departure from other flameless concepts.

During the flameless mode shown in FIG. 3B, the firebox 102 runs at an equilibrium temperature which is well above the auto-ignition temperature of methane (1280° F.). A portion of the flue gas coming from the firebox 102 is recycled back, in order to maximize the flue gas velocity and thus the convective heat transfer inside the firebox 102.

Also, during flameless mode, the flue gas is at very high temperature, typically 1500° F. and higher. It will not be cost-effective to use flue gas fans at this temperature. Instead, the fuel is injected into several high-efficiency venturis that are used to entrain and recycle high temperature flue gas back into the firebox 102. By mixing the fuel with the inert flue gas, it will be highly diluted before entering the oxidation zones.

Figure 4:
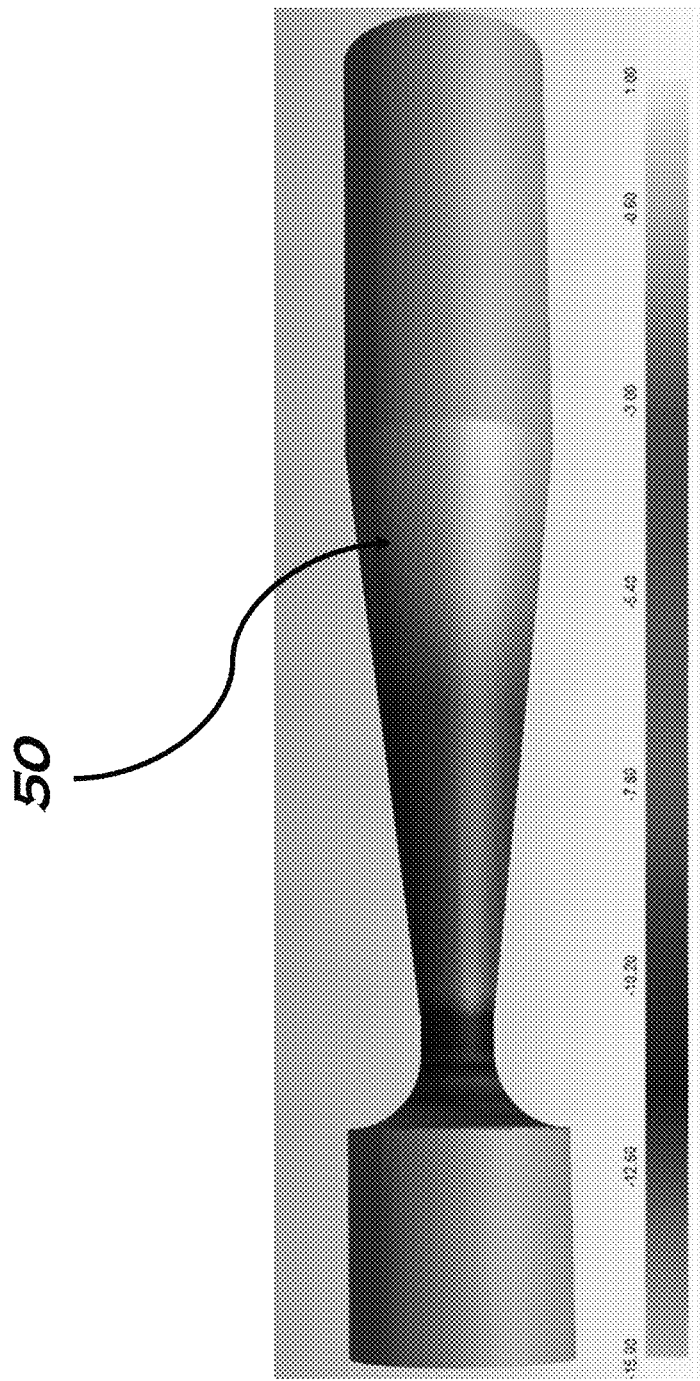
FIG. 4 is the relative pressure plotted against the venturi eductor in accordance with an illustrative embodiment of the invention disclosed herein.
Figure 5:
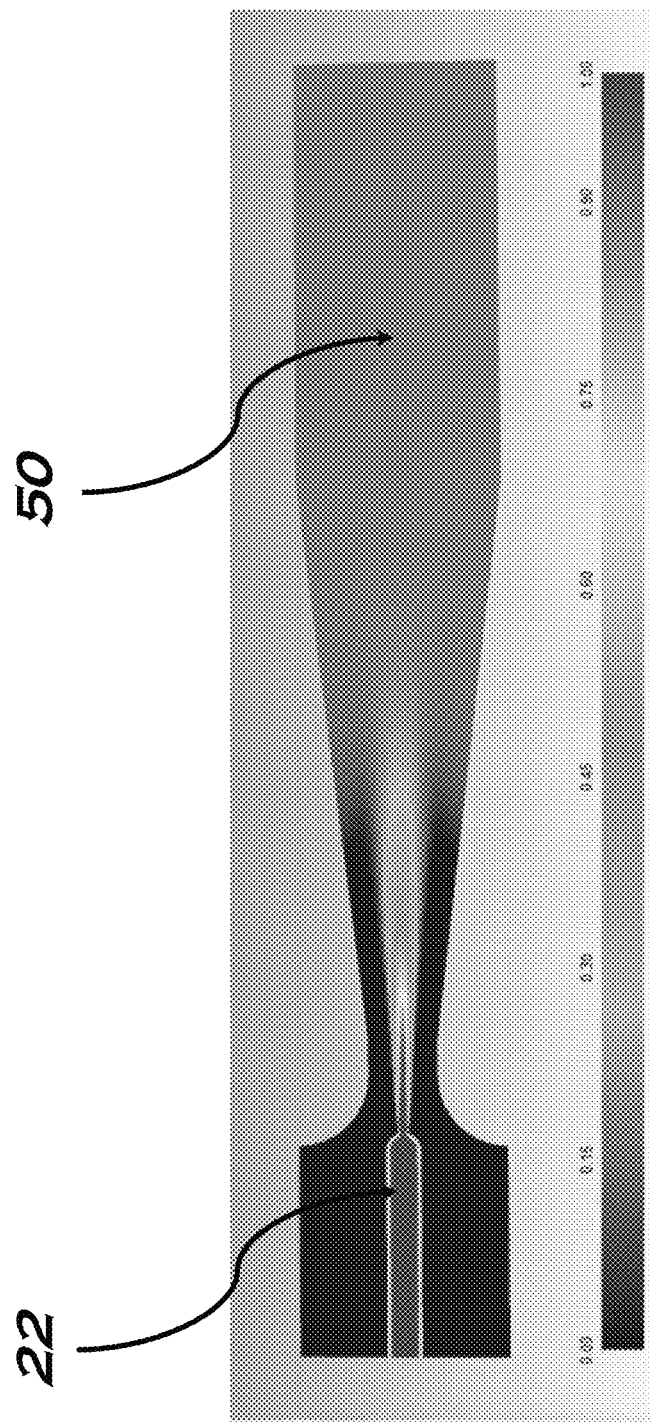
FIG. 5 is a cross-sectional view of the venturi nozzle illustrating the location of the fuel injector and the effect on the methane concentration in accordance with an illustrative embodiment of the invention disclosed herein.

FIG. 4 and FIG. 5 show exemplary shapes of a venturi eductor nozzle 50, the location of a fuel injector 22 and the effect on the concentration of fuel, in this case methane. A well-designed venturi is capable of entraining seven (7) pounds of flue gas per pound of fuel with fuel gas at 20-35 psig pressure. Since one (1) pound of fuel produces 20 pounds of flue gas, this means 7/20=35% of the flue gas can recirculated back into the firebox 102.

By using multiple venturis 50 (i.e. one venturi per 2 MMBtu/h liberation rate), the flue gas/fuel mixture can be injected in multiple locations throughout the heater 100 in a manner that maximizes dilution of the fuel and prevents any flame fronts, while possibly creating a strong swirling flow, in a manner that will also dilute the incoming air and in a manner that will maximize the convective heat transfer to the coils. In this manner the heat transfer to refractory-facing side of the tubes is increased, reducing the total radiant section duty required. This will in turn reduce the peak temperatures on the burner-facing side of the tubes due to reduced firing rate and radiation heat transfer.

More uniform heat transfer reduces the fouling rate of the tubes due to the reduction in area of the highest temperature regions of the tube. This reduced fouling rate in turn reduces the increase in firing rate required over the run-length of the fired heater due to reduced coke deposits on the inside of the tube surface and reduced thermal resistivity. Over the same period of time, the heater fires at a lower rate, and so the net fuel efficiency is increased.

Figure 6:
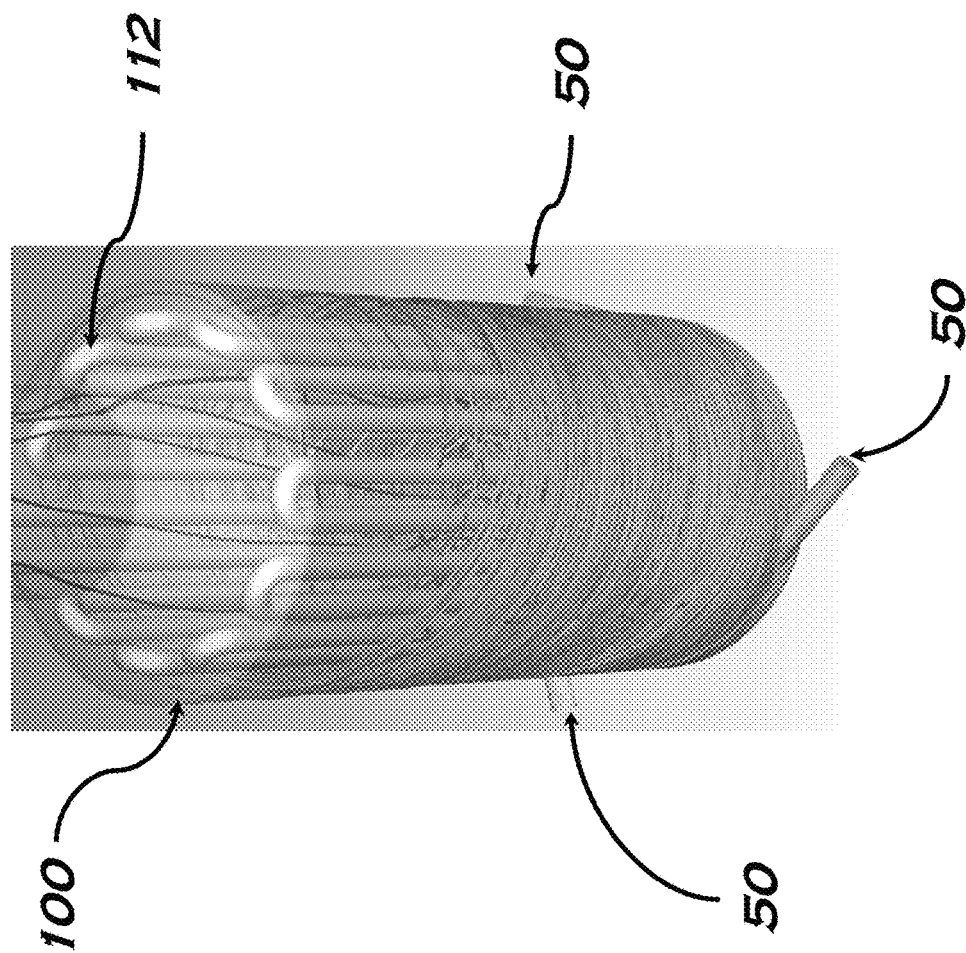
FIG. 6 is a perspective view of three venturis positioned and angled to create a high tangential velocity in a fired process heater in accordance with an illustrative embodiment of the invention disclosed herein.
Figure 7:
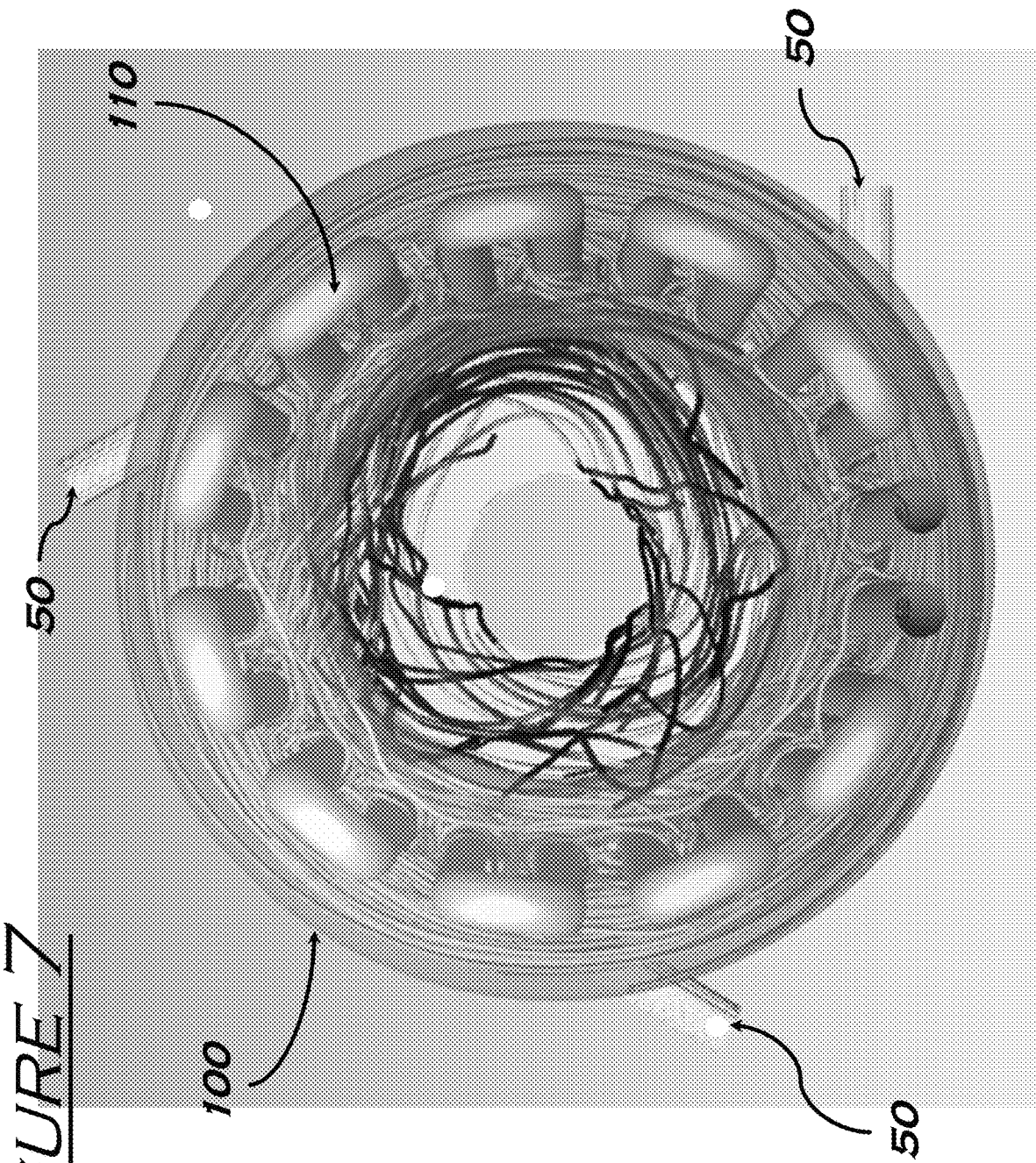
FIG. 7 is a top view of three venturis positioned and angled to create a high tangential velocity in a fired process heater in accordance with an illustrative embodiment of the invention disclosed herein.

Turning now to FIGS. 6 and 7, three venturis 50 are positioned and angled to create a high tangential velocity. Air for combustion enters through the center of the floor of the heater 100, and gradually mixes with the fuel as the mixture travels through the firebox 102. Path lines, colored by temperature, show very small temperature gradients inside the radiant section 102, which indicates absence of high temperature flame fronts. The tangential disposition of the venturis 50 is not required for the operation of the heater 100 in flameless mode. The flue gas entrainment units 10 could instead be directed between the tubes 112 to the center of the heater 100, from the top of the heater 100 toward the floor, or mounted on the floor and directed upward. Placement of the flue gas entrainment units to create and even temperature field reduced the negative effects of the burner heat flux profile on heat transfer efficiency.

Figure 8:
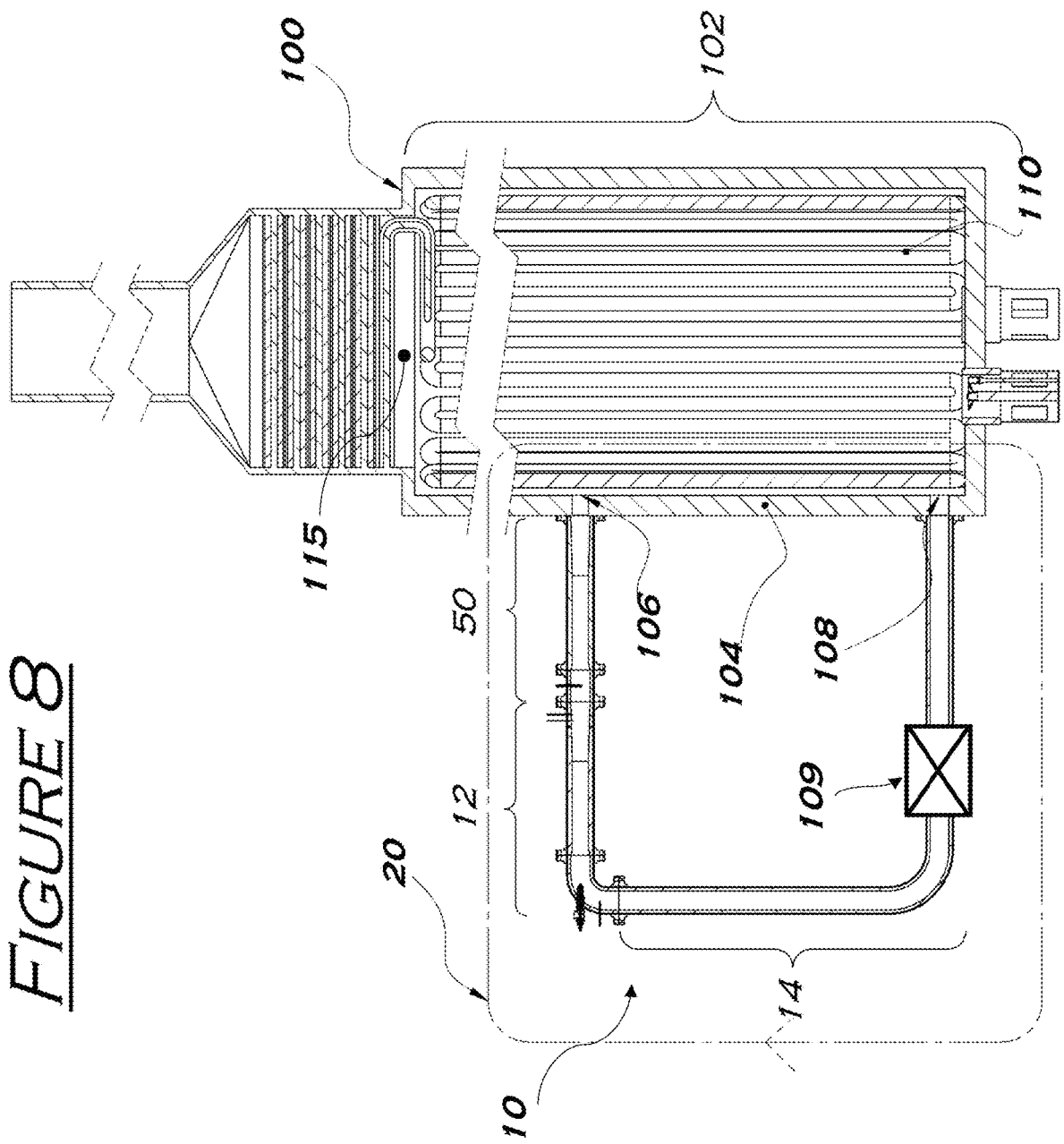
FIG. 8 is a cross-sectional view of a fired process heater having a flue gas entrainment unit and associated ductwork attached thereto in accordance with an illustrative embodiment of the invention disclosed herein.

Referring now to FIG. 8, the device 10 for reducing emissions of nitrogen oxides and for increasing heat transfer in the fired process heater 100 includes one or more flue gas entrainment units 12, ductwork 14 attached from a radiant section or firebox 102 of the fired process heater 100 to each flue gas entrainment unit 12, and optionally a heat transfer 109 to remove heat from the flue gas in the ductwork 14 leading to each entrainment unit 12.

An opening 106 is cut through an exterior heater wall 104, including a heater steel casing and refractory wall, of the fired process heater 100 of effectively the same diameter as a downstream fluid outlet 16 of the flue gas entrainment unit 12. The flue gas entrainment unit 12 attaches to the exterior heater wall 104 wall using bolting, welding, or any mechanically suitable method to attach the entrainment unit 12 such that the fluid outlet 16 of the flue gas entrainment unit 12 is axially aligned with the opening 106 in the heater casing of exterior heater wall 104. A length of ductwork 14 may be placed between the fluid outlet 16 of the entrainment unit 12 and the exterior heater wall 104. A second opening 108 is cut through the exterior heater wall 104. From the second opening 108, the ductwork 14 attaches to an upstream fluid inlet 18 of the flue gas entrainment unit 12. The ductwork 14 may have an internal lining of refractory material encased in steel or have an internal high-temperature steel lining with external installation. The device 10 makes a closed circuit 20 with respect to the flue gas from the radiant section 102 of the fired heater 100 and allows for the injection of fuel gas or a secondary fluid.

Figure 9:
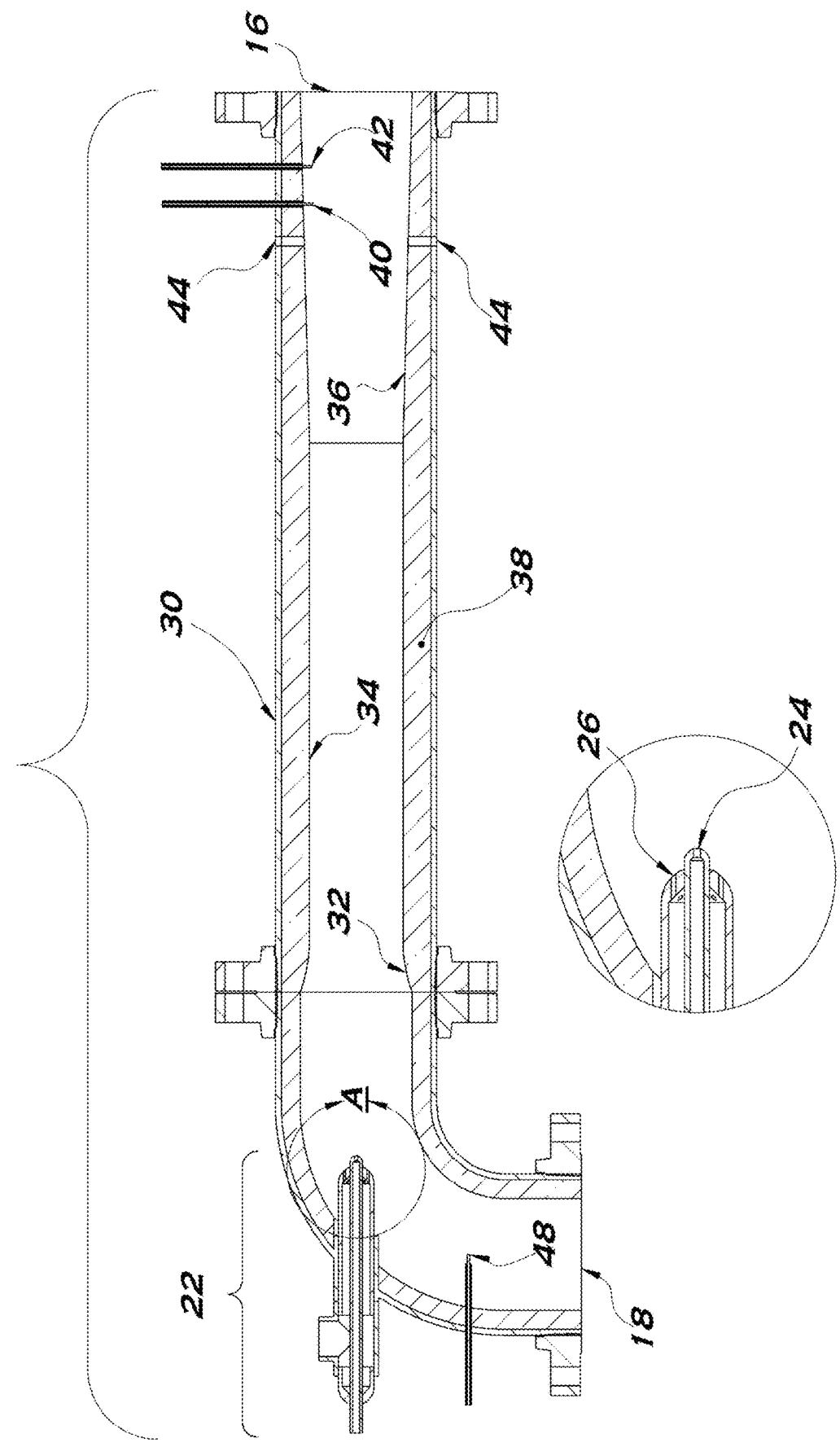
FIG. 9 is a cross-sectional view of the flue gas entrainment unit of FIG. 8.

Referring to FIG. 9, each flue gas entrainment unit 12 includes a fuel injector 22 with a nozzle 24 from which the fuel issues at subsonic, sonic, or supersonic velocity. The flue gas entrainment unit 12 may also include a secondary fluid injector 26 with a nozzle from which the fluid issues at subsonic, sonic, or supersonic velocity. The secondary fluid injector 26 can be either steam and a diluent and motive fluid or ammonia or urea as a reagent for selective non-catalytic reactions with any oxides of nitrogen that are present in the flue gas of the heater.

A section 30 of the entrainment unit has interior dimensions that produce an inlet section of reducing diameter 32, a mixing section of constant diameter 34, and an exit section of expanding diameter 36. The flue gas entrainment unit 12 may be constructed with an interior core of heat resistant material 38, such as a refractory ceramic oxide, and an exterior casing of steel. Alternatively, the entrainment unit 12 may be constructed with an interior of heat resistant steel encased with external insulation. Each flue gas entrainment unit 12 may contain a thermocouple 40 downstream of the fuel injector 22. In addition, each flue gas entrainment unit may include a zirconia oxygen sensor 42 and/or two ports 44 for access by a tunable diode laser 46. Each flue gas entrainment unit 12 or the ductwork 14 connected to the flue gas entrainment unit 12 may contain a hot-wire anemometer 48.

Figure 10:
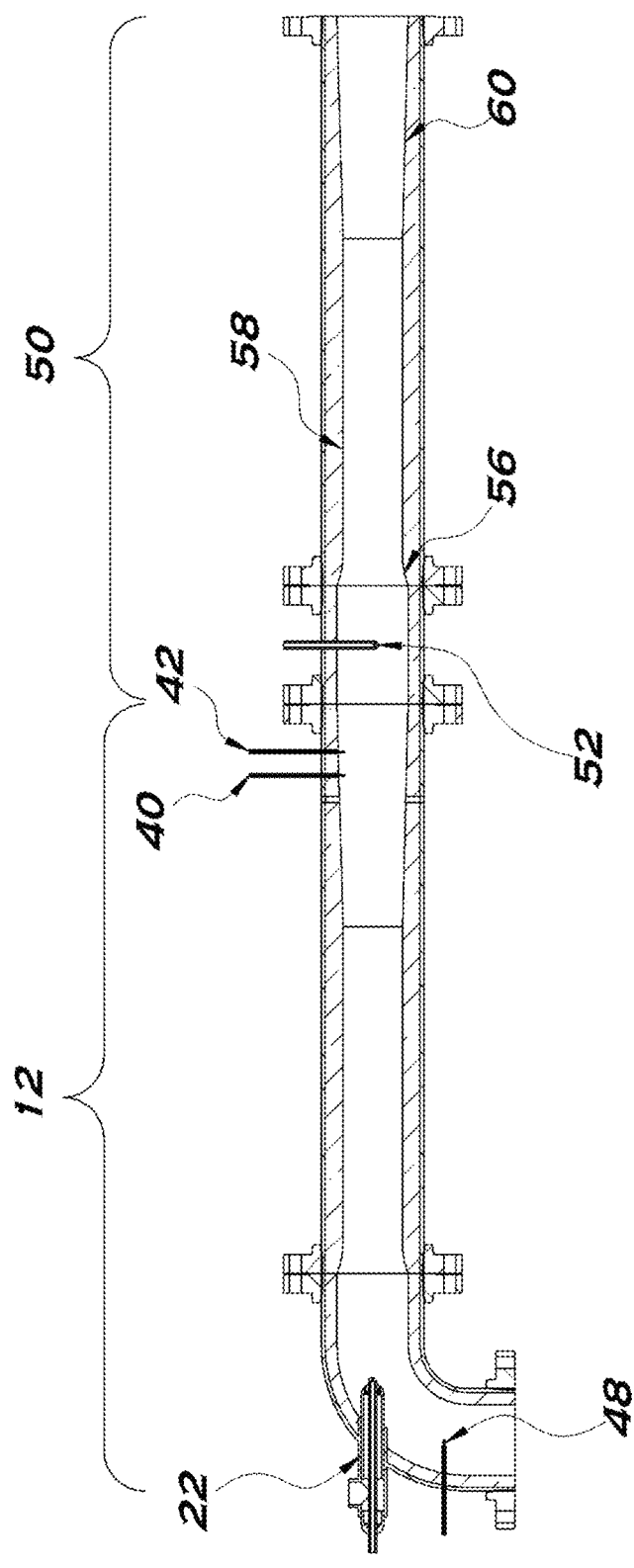
FIG. 10 is a cross-sectional view of the flue gas entrainment unit of FIG. 8 connected to a venturi eductor in accordance with an illustrative embodiment of the invention disclosed herein.

As exemplified in FIG. 10, the device 10 can also include a venturi eductor 50 using a secondary fluid, such as steam, as the high pressure motive force fluid can be placed between the fluid outlet 16 of the flue gas entrainment unit 12 and the heater wall 104 such that venturi eductor 50 can be used to increase the pressure differential between the upstream 18 and downstream side 16 of the flue gas entrainment unit 12, thus increasing the flow through the flue gas entrainment unit 12. A section 54 of the venturi eductor 50 has interior dimensions that produce an inlet section of reducing diameter 56, a mixing section of constant diameter 58, and an exit section of expanding diameter 60. A third fluid injector 52 can be used to inject steam, ammonia or urea as a reagent for selective non-catalytic reactions with any oxides of nitrogen that are present in the flue gas of the heater.

Turning now to FIG. 11, the device 10 may include a control circuit 1100 to control the method for reducing emissions of nitrogen oxides and for increasing heat transfer in the fired process heater 100. The control circuit 1100 begins in a WAIT state 1102. The permissive conditions for the control circuit 1100 in a startup state differ from those while the control circuit 1100 is in steady operation. The control circuit 1100 only permits operation in each state if the system meets the described permissive conditions. If the conditions are not met for a given state, fuel and/or secondary is routed from the flue gas entrainment units 12 back to the burners of the heater 100 and the control circuit 1100 is returned to a WAIT state 1102 until system startup is again initiated.

A temperature sensor 115 at the exit of the radiant section 104 sends a signal to control circuit 1100. If the temperature indicated is greater than the calculated autoignition temperature of the fuel gas in air, the system meets the TEMP_GLOBAL permissive condition 1108, and the control circuit 1100 enters the WAIT TEMPERATURE state 1104.

An oxygen sensor located at the exit of the radiant section 104 or in the stack of the heater 100 sends a signal to the control circuit 1100. The control circuit 1100 calculates the limiting or minimum oxygen concentration of the fuel (MOC) and compares it to the oxygen sensor reading. The minimum oxygen is the concentration of oxygen below which combustion is not possible for a given fuel. If the measured oxygen concentration is less than the minimum oxygen concentration of the fuel, then the system meets the MOC_GLOBAL permissive condition 1106 for operation. This MOC_GLOBAL permissive condition 1106 is in place for both the startup state and the steady operation state.

After the system meets the MOC_GLOBAL condition 1106 and the TEMP_GLOBAL condition 1108 for operation, the system enters the START UNIT state 1110, and fuel gas redirected from the burner fuel supply or secondary fluid is injected into each flue gas entrainment unit 12. Each unit 12 is placed in the START UNIT state 1110 with an initially prescribed minimum flow of fuel. In this START UNIT state 1110, the control circuit 1100, in a loop, compares the calculated or measured flow rate of the fuel to either a pre-calculated database of entrained flue gas flow rates based on the fuel flow or pressure or the flue gas flow rate as measured from the hot-wire anemometer 48. The control circuit 1100 calculates the concentration of fuel gas exiting the flue gas entrainment unit 12. If the calculated concentration is less than the lower-flammability limit of the fuel in the flue gas mixture for time longer than 10 flue gas volume exchanges through the flue gas circuit 20 connected to the respective flue gas entrainment unit 12, a LFL_LOCAL permissive condition 1112 is met. The control circuit 1100 uses this LFL_LOCAL permissive condition 1112 only for the startup state.

If the system meets the TEMP_GLOBAL condition 1108, MOC_GLOBAL condition 1106, and LFL_LOCAL condition 1112, the control circuit 1100 changes the state to one of READY-for-operation 1114.

The thermocouple 40 or tunable diode laser 46 relays a signal to the control circuit 1100. This signal indicates the temperature in the flue gas entrainment unit 12 downstream of the fuel injector 22 and the secondary fluid injector 26. If the temperature exceeds the calculated auto-ignition temperature of the fuel in the associated flue gas entrainment unit 12 given the calculated flue gas composition, then the TEMP_LOCAL condition 1116 is set.

For each flue gas entrainment unit 12, the control circuit 1100 determines the flow rate of flue gas issuing from the entrainment unit 12 from either a pre-calculated database of entrained flue gas flow rates based on the fuel and/or flow or pressure or the flue gas flow rate as measured from the hot-wire anemometer 48. Based on the exit area of the flue gas entrainment unit 12, the calculated or measured temperature, and the calculated or measured flow rate, the control circuit 1100 calculates the exit velocity of the flue gas entrainment unit 12. If the exit velocity exceeds the turbulent flame speed of the mixture as calculated given the measured or approximated fuel and flue gas composition, the VEL_LOCAL condition 1118 is set.

If the system meets both the TEMP_LOCAL condition 1116 and the VEL_LOCAL condition 1118, the control circuit 1100 places the flue gas entrainment unit 12 into a RUN state 1120.

The flue gas or secondary fluid flow rate is controlled by the control circuit 1100 such that the flow rate is maximized to a preset limit or to a point such that the temperature remains above the limits used to set the TEMP_LOCAL condition 1116 and the VEL_LOCAL condition 1118. The system may optionally ignore the TEMP_LOCAL condition 1116 so long as system meets the VEL_LOCAL condition 1118. Alternately, the control circuit 1100 can substitute the TEMP_GLOBAL condition 1108 for the TEMP_LOCAL condition 1116 if the flue gas temperature in the radiant section 102 of the heater 100 is known to be sufficiently uniform.

If the system continues to meet the TEMP_LOCAL condition 1116 and the VEL_LOCAL condition 1118, the control circuit 1100 remains in the RUN state 1120, for evaluated independently for each flue gas entrainment unit 12 such time as these conditions are not met or an operator initiates the shutdown of the system. If local flue gas entrainment units 12 do not meet the conditions of TEMP_LOCAL condition 1116 and the VEL_LOCAL condition 1118, the venturi eductor 50 will enter the LOCAL SHUTDOWN state 1122. In the LOCAL SHUTDOWN state 1122, the control circuit 1100 requests the prescribed minimum fuel flow and returns the flue gas entrainment unit 12 to the START UNIT state 1110.

The control circuit 1100 will initiate a global system shutdown if the heater 100 does not meet the state requirements for the TEMP_GLOBAL condition 1116 and the MOC_GLOBAL condition 1106; the system will be placed into the WAIT state 1102 and the fuel flow is removed from the flue gas entrainment units 12.

When transitioning from any other state to the WAIT state 1102, the fuel is redirected from the flue gas entrainment units 12 over a period such that the burners in the heater 100 will not exhibit flame instability until the flow of fuel to the flue gas entrainment units 12 is zero. The flow of any secondary fluid to the flue gas entrainment unit 12 or downstream venturi educators 50 will be reduced to zero over a similar period.

Calculated values described in the control scheme above may be constant values determined from prior calculations external to a computer system used as the control circuit 1100. As used herein, the term "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, Unix, iOS, Android, Chrome OS, Windows Mobile, Windows CE, Windows Phone OS, Blackberry OS, and the like.

The devices, systems and methods described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or methods described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the instant disclosure may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A device for reducing emissions of nitrogen oxides and for increasing heat transfer in a fired process heater, said fired process heater comprising a radiant section having a plurality of process tubes and a burner, said device comprising:
   a fuel and flue gas entrainment unit positioned remote from the burner of the fired process heater, the entrainment unit comprising:
      a fluid outlet, a fluid inlet, and a fluid flow path intermediate of said fluid inlet and said fluid outlet; said entrainment unit fluid outlet configured to attach to said fired process heater upstream of one or more convection tubes such that said entrainment unit fluid flow path is in fluid communication with said radiant section of said fired process heater;
      an inlet section of reducing diameter, a mixing section of constant diameter, and an exit section of expanding diameter;
      a fuel injector configured to issue fuel at subsonic, sonic, or supersonic velocity into said entrainment unit fluid flow path, wherein the fuel is entrained with flue gas from said radiant section of said fired process heater in said entrainment unit fluid flow path to form an entrained flue gas and fuel mixture, which flows through said entrainment unit fluid flow path to said radiant section of said fired process heater;
   ductwork positioned remote from the burner of the fired process heater, the ductwork comprising a fluid outlet, a fluid inlet, and a fluid flow path intermediate of said fluid inlet and said fluid outlet; said ductwork fluid outlet connected to said entrainment unit fluid inlet such that said ductwork fluid flow path is in fluid communication with said entrainment unit flow path; said ductwork fluid inlet configured to attach to said fired process heater such that said ductwork fluid flow path is in fluid communication with the flue gas from said radiant section of said fired process heater; and
   wherein the entrainment unit and the ductwork form a closed circuit regarding fluid flow from the radiant section of the fired process heater, through the ductwork fluid flow path, the entrainment unit fluid flow path, and back to the radiant section of the fired process heater.

2. The device of claim 1 wherein said ductwork further comprises an internal lining of refractory material encased in steel, an internal high-temperature steel lining with external insulation, or both.

3. The device of claim 1 wherein said entrainment unit further comprises a fluid injector configured to issue a reagent fluid at subsonic, sonic, or supersonic velocity into said entrainment unit fluid flow path wherein the reagent fluid is mixed with the flue gas from said radiant section of said fired process heater and the fuel from the fuel injector.

4. The device of claim 3 wherein said reagent fluid is steam, ammonia, urea or a mixture thereof.

5. The device of claim 1 wherein said entrainment unit further comprises an interior core of heat resistant material and an exterior casing of steel, an interior of heat resistant steel encased with external insulation, or both.

6. The device of claim 1 wherein said entrainment unit further comprises a thermocouple downstream of said fuel injector, a zirconia oxygen sensor downstream of said fuel injector, a tunable diode laser downstream of said fuel injector, or a combination thereof.

7. The device of claim 1 wherein said entrainment unit, said ductwork or both further comprise a hot-wire anemometer.

8. The device of claim 1 further comprising a venturi eductor configured to attached to said entrainment unit fluid outlet and further configured to attach to said radiant section of said fired process heater.

9. The device of claim 8 wherein said venturi eductor further comprises a fluid outlet, a fluid inlet and a fluid flow path intermediate of said fluid inlet and said fluid outlet, said venturi eductor fluid inlet connected to said entrainment unit fluid outlet such that said venturi eductor fluid flow path is in fluid communication with said entrainment unit flow path.

10. The device of claim 9 wherein said venturi eductor is configured to use a secondary fluid to increase the fluid flow of the entrained flue gas and fuel mixture through said flue gas entrainment unit.

11. The device of claim 10 wherein said secondary fluid is steam.

12. The device of claim 8 wherein said venturi eductor has an inlet section of reducing diameter, a mixing section of constant diameter, and an exit section of expanding diameter.

13. The device of claim 8 wherein said venturi eductor further comprises a fluid injector configured to issue a reagent fluid at subsonic, sonic, or supersonic velocity into said fluid flow path of said venturi eductor.

14. The device of claim 13 wherein said reagent fluid is steam, ammonia, urea or a mixture thereof.

15. A device for reducing emissions of nitrogen oxides and for increasing heat transfer in a fired process heater, said fired process heater comprising a radiant section having a plurality of process tubes and a burner, said device comprising:
   a fuel and flue gas entrainment unit positioned remote from the burner of the fired process heater, the entrainment unit comprising a fluid outlet, a fluid inlet and a fluid flow path intermediate of said fluid inlet and said fluid outlet; said entrainment unit further comprising an inlet section of reducing diameter, a mixing section of constant diameter, and an exit section of expanding diameter; wherein fuel is entrained with flue gas from the radiant section of the fired process heater in the fluid flow path of the entrainment unit to form an entrained flue gas and fuel mixture, which flows from the fluid outlet of the entrainment unit to a fluid inlet of a venturi eductor;

ductwork positioned remote from the burner of the fired process heater, the ductwork comprising a fluid outlet, a fluid inlet and a fluid flow path intermediate of said fluid inlet and said fluid outlet; said ductwork fluid outlet connected to said entrainment unit fluid inlet such that said ductwork fluid flow path is in fluid communication with said entrainment unit flow path; said ductwork fluid inlet configured to attach to said fired process heater such that said ductwork fluid flow path is in fluid communication with the flue gas from said radiant section of said fired process heater;

the venturi eductor comprising a fluid outlet, the fluid inlet and a fluid flow path intermediate of said fluid inlet and said fluid outlet; said venturi eductor fluid inlet connected to said entrainment unit fluid outlet such that said venturi eductor fluid flow path is in fluid communication with said entrainment unit fluid flow path; said venturi eductor fluid outlet attached to said fired process heater upstream of a plurality of convection tubes such that said venturi eductor fluid flow path is in fluid communication with said radiant section of said fired process heater; said venturi eductor comprising an inlet section of reducing diameter, a mixing section of constant diameter, and an exit section of expanding diameter; said venturi eductor configured to use a secondary fluid to increase the fluid flow through said flue gas entrainment unit; wherein the entrained flue gas and fuel mixture and the secondary fluid flow from the fluid outlet of the venturi eductor to the radiant section of the fired process heater; and wherein the entrainment unit, the ductwork, and the venturi eductor form a closed circuit regarding fluid flow from the radiant section of the fired process heater, through the ductwork fluid flow path, the entrainment unit fluid flow path, and the venturi eductor fluid flow path, and back to the radiant section of the fired process heater.

16. The device of claim 15 wherein said ductwork further comprises an internal lining of refractory material encased in steel, an internal high-temperature steel lining with external insulation, or both.

17. The device of claim 15 wherein said secondary fluid is steam, ammonia, urea or a mixture thereof.

18. The device of claim 15 wherein said entrainment unit, said venturi eductor or both further comprise an interior core of heat resistant material and an exterior casing of steel, an interior of heat resistant steel encased with external insulation, or both.

19. The device of claim 15 wherein said entrainment unit further comprises a thermocouple downstream of said fuel injector, a zirconia oxygen sensor downstream of said fuel injector, a tunable diode laser downstream of said fuel injector, or a combination thereof.

20. The device of claim 15 wherein said entrainment unit, said ductwork or both further comprise a hot-wire anemometer.

21. The device of claim 15 wherein said entrainment unit, said venturi eductor or both further comprise a fluid injector configured to issue a reagent fluid at subsonic, sonic, or supersonic velocity into said entrainment unit fluid flow path or said venturi eductor fluid flow path, respectively.

22. The device of claim 21 wherein said reagent fluid is ammonia, urea or a mixture thereof.

23. A fired process heater comprising a radiant section having a plurality of process tubes and a burner, said fired process heater further comprising the device of claim 1.

24. A fired process heater comprising a radiant section having a plurality of process tubes and a burner, said fired process heater further comprising the device of claim 15.

* * * * *